Figure 1:
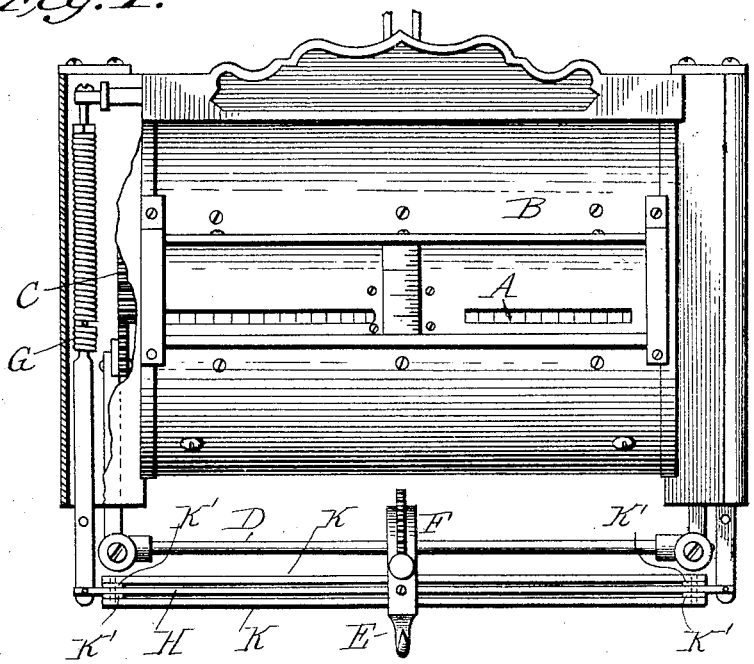

No. 776,754. PATENTED DEC. 6, 1904.
A. N. OZIAS.
SPRING BALANCE SCALE.
APPLICATION FILED APR. 2, 1904.
NO MODEL.

Witnesses
Edwin L. Yewell
Thomas Durant

Inventor
Albert N. Ozias
By Church & Church
his Attorneys

No. 776,754.          Patented December 6, 1904.

UNITED STATES PATENT OFFICE.

ALBERT N. OZIAS, OF MINNEAPOLIS, MINNESOTA.

SPRING-BALANCE SCALE.

SPECIFICATION forming part of Letters Patent No. 776,754, dated December 6, 1904.

Application filed April 2, 1904. Serial No. 201,338. (No model.)

*To all whom it may concern:*

Be it known that I, ALBERT N. OZIAS, a citizen of the United States, residing at Minneapolis, in the county of Hennepin and State of Minnesota, have invented certain new and useful Improvements in Spring-Balance Scales; and I do hereby declare the following to be a full, clear, and exact description of the same, reference being had to the accompanying drawings, forming a part of this specification, and to the letters of reference marked thereon.

In scales designed for weighing either in units of weight or in units of value and dependent upon the power of a spring or springs for counterbalancing the weight of the load difficulty has been experienced in securing accuracy and uniformity of action, due in a large measure to the contraction and expansion of the working parts of the scale as the temperature of the surrounding air changes. The difficulties are especially noticeable where a coil spring or springs form the counterbalancing means, as with such springs this counterbalancing strength or their distortion under a given load is changed very materially by even slight changes in temperature. It has been heretofore proposed to overcome the difficulties, first, by mechanical appliances, and, secondly, by a thermostatic arrangement such as will neutralize the variation in the effective action of the springs. Mechanical appliances have not been found to answer, because they require manual adjustment for the temperature which may be prevailing at the time and also because dealers may intentionally or accidentally manipulate the scale to the disadvantage of the purchaser, and the thermostatic principle as heretofore applied, while answering well for some types of scales, has not proven satisfactory for others, besides which it is expensive and liable to be thrown out of adjustment.

The objects of the present invention are to overcome the difficulties caused by changes in temperature, and while it approximates closely a thermostatic arrangement in that the effect of variations in temperature upon metals having different coefficients of expansion is utilized to neutralize the variation in the effective action of the spring or springs there is no distortion of the thermostatic members due to change in temperature or to the weight of the load, and as a consequence no additional elements of uncertainty are introduced, and the scale may be set up and sealed without the necessity of taking into account the irregularities which might be occasioned by a thermostatic arrangement subject to such distortion.

The invention consists, primarily, in a scale embodying in its construction a spring adapted to be distorted by the weight of the load and a thermostatic member or members combined therewith in such manner as to put the spring under increasing tension as the temperature rises without tendency to distort the spring, but whereby the resistance of the spring to distortion under the weight of the load is increased.

The invention further consists in a spring adapted to be deflected transversely of its length and intermediate its ends by the weight of the load, combined with a thermostatic member for imposing increasing longitudinal tension on the spring as the temperature rises, whereby its resistance to distortion is proportionally increased.

Finally, the invention consists in certain novel details of construction and combinations and arrangements of parts, all as will be now described, and pointed out particularly in the appended claims.

Figure 2:
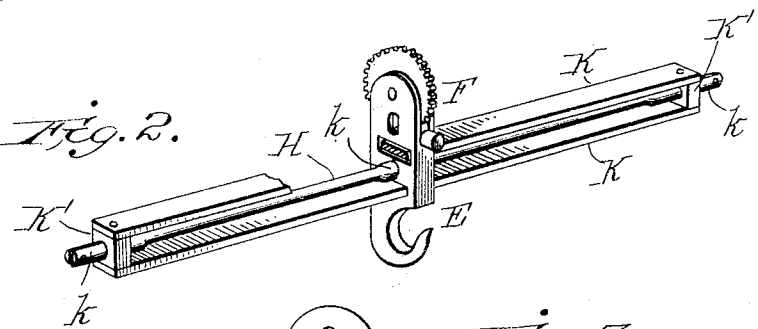
Figure 3:
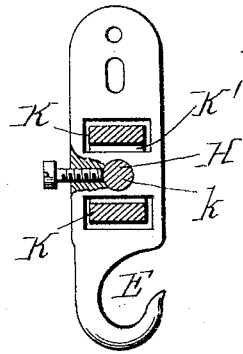

Referring to the accompanying drawings, Figure 1 is a front elevation of a scale embodying the present invention, certain parts of the inclosing casing being omitted. Fig. 2 is a detail perspective view of a preferred form of spring and thermostatic arrangement. Fig. 3 is a cross-section through the load-support, showing one way of connecting said support with the spring.

Like letters of reference in the several figures indicate the same parts.

The scale adopted for illustrating the application of the present invention is of a well-known type embodying a rotary indicator A in the form of a drum, preferably inclosed in a casing B and adapted to be rotated by a rack-bar or rack-bars C, meshing with a pinion or pinions on the shaft of the indicator.

In this particular type of scale the rack-bars are connected together and to the load-support E by a cross-bar D, preferably somewhat elastic, and connected with the load-support by any ordinary form of connection, as indicated at F. The load-support illustrated is in the form of a hook with which the pan-lever of a platform-scale or other part adapted to directly receive the load may be connected. In this form of scale when the invention is applied thereto the load-support is carried by a system of springs composed of end springs G and a transverse spring in the form of a bar H, connected at the ends with the springs G and at the center with the load-support. When the load is applied, the springs G are distorted by extension and the spring H by being deflected or bent downward intermediate its ends.

An increase in temperature, while not appreciably affecting the position of the indicator when no load is on the scale, does cause a softening or weakening of the counterbalancing-springs, which is more and more manifest as the weight of the load increases. Thus a rise in temperature which would cause the scale to indicate incorrectly to the extent of one-half ounce with a five-pound load may cause the scale to indicate incorrectly to the extent of several ounces with a load of twenty pounds. This is due largely to the fact that the elasticity of metal is reduced by an elevation in temperature and to the further fact that the diameter of the coils and length of the metal in the spring are increased. To overcome the difficulty, it is obvious that it is desirable that the means employed should not affect the registration of the scale at the zero-point, but that it shall make itself manifest progressively as the weight of the load is increased to prevent overregistration at a high temperature and underregistration at a low temperature, and to accomplish these desirable ends I now provide a thermostatic mechanism which will put the transverse spring H under increasing longitudinal tension as the temperature rises, and consequently said spring will yield or be deflected under the influence of the load to a less and less extent, and as the spring is held at the ends its resistance to further deflection increases progressively in proportion to the load.

Obviously the invention may be carried into effect in a variety of different ways; but in the simple embodiment shown K K indicate two brass bars of relatively heavy section and anchored rigidly at the ends to the ends of the spring H, which latter may be of steel and either of angular section, as in Fig. 1, or round, as in Figs. 2 and 3. In the latter instance the spring is preferably provided with end and central enlargements $k$ to facilitate the attachment of the thermostat-bars and load-support. The thermostat-bars K operate by endwise expansion to increase or decrease the longitudinal tension of the spring H, and while they partake of the bodily movements of the spring and load-support it is not intended that they shall be deflected or bent either in their thermostatic action or in the operation of the scale, and therefore, as before stated, they are preferably of heavy cross-section or of such form in cross-section as to resist any lateral deflection or bowing, and they preferably pass the load-support without engaging the same.

The bars K K have blocks K' interposed between their ends, and rivets or other form of fastening unite the ends of the bars and spring rigidly, the bars thus, in effect, forming a single thermostatic tensioning device for the spring, which does not by its action deflect or distort the spring when the indicator is at zero.

In assembling the spring and thermostat it will be found that the best results will accrue if the parts be assembled when at a comparatively-low temperature, thus avoiding any bowing of the spring at low temperatures, although at temperatures lower than that at which the parts are assembled the spring will be under compression, particularly where it is a straight bar-spring, as illustrated.

In operation the thermostat increases the longitudinal tension of the spring as the temperature rises, and as a consequence the spring will be deflected by the load less than would be the case at lower temperatures. The deflection of the spring is resisted more and more as it is increased by the load, and the practical result is to cause the indicator to register correctly at all temperatures and under all loads within the capacity of the scale.

Having thus described my invention, what I claim as new, and desire to secure by Letters Patent, is—

1. The combination with a spring adapted to be deflected transversely intermediate its ends and means for supporting the ends of the spring of a thermostat connected with said spring outside of the part adapted to be deflected and adapted to increase its longitudinal tension as the temperature increases whereby the resistance of the spring to deflection is increased; substantially as described.

2. In a scale, the combination with a counterbalancing-spring, an indicator and a load-support connected with the spring intermediate its ends, of a thermostat coöperating with said spring to increase its longitudinal tension and resistance to deflection as the temperature rises; substantially as described.

3. In a scale, the combination with indicating mechanism, a load-support and a counterbalancing-spring adapted to be deflected transversely by the load, of means for automatically increasing the longitudinal tension of said spring and its resistance to deflection as the temperature rises; substantially as described.

4. In a scale, the combination with indicating mechanism, a counterbalancing-spring, and a load-support connected with said spring at a point intermediate the ends of the spring, of a thermostatic regulator connected with and acting longitudinally of the spring to increase its tension and resistance to deflection as the temperature rises but without tendency to deflect the spring when in normal position; substantially as described.

5. In a scale, the combination with indicating mechanism, a counterbalancing-spring and a load-support connected with the spring at a point intermediate the ends of the spring, of a thermostat connected at opposite ends with opposite ends of the spring and operating to increase the longitudinal tension of the spring without tendency to deflect the same as the temperature rises; substantially as described.

6. In a scale, the combination with indicating mechanism, a counterbalancing-spring and a load-support connected with the spring at an intermediate point, of a rigid thermostat connected at opposite ends with opposite ends of the spring and free from the spring throughout its intermediate part; substantially as described.

7. In a scale, the combination with indicating mechanism, a counterbalancing-spring having a bodily movement and a load-support connected with the spring at an intermediate point and adapted to deflect said spring where a load is applied, of a rigid thermostat connected rigidly at opposite ends with opposite ends of the spring and adapted to increase the longitudinal tension of the spring without tendency to deflect the same; substantially as described.

8. In a scale, the combination with indicating mechanism, a counterbalancing-spring system embodying coil and bar springs, and a load-support connected with the bar-spring, of a rigid thermostat rigidly connected at opposite ends with opposite ends of the bar-spring and operating to increase the longitudinal tension of the same as the temperature rises; substantially as described.

9. In a scale the combination with indicating mechanism, a counterbalancing-spring system embodying two coil-springs and a bar-spring suspended by its ends between them, of a load-support carried by the bar-spring intermediate its ends, and a rigid thermostat connected at opposite ends with opposite ends of the bar-spring and free from said bar-spring throughout its intermediate part; substantially as described.

10. In a scale, the combination with indicating mechanism, a counterbalancing-spring system embodying two coil-springs and a bar-spring suspended by its ends between them, a connection between the center of said bar and indicating mechanism and a load-support connected with the center of said bar, of a rigid thermostat rigidly connected at opposite ends with opposite ends of the bar and free from the bar throughout its intermediate part, said thermostat being independent of the indicator and load-support connections; substantially as described.

11. The combination with a spring adapted to be deflected transversely intermediate its ends, of a rigid thermostat rigidly connected at opposite ends with opposite ends of the spring to increase the longitudinal tension of the spring as the temperature rises; substantially as described.

ALBERT N. OZIAS.

Witnesses:
MAUDE SPICER,
ALBERT V. PETERSON.